United States Patent [19]

Mumenthaler

[11] Patent Number: 4,688,944

[45] Date of Patent: Aug. 25, 1987

[54] MIXER HEAD FOR PLASTICS MATERIAL COMPONENTS

[76] Inventor: Fritz Mumenthaler, Berneckstrasse 6, CH-9000 St. Gallen, Switzerland

[21] Appl. No.: 767,858

[22] Filed: Aug. 21, 1985

[30] Foreign Application Priority Data

Aug. 24, 1984 [DE] Fed. Rep. of Germany ....... 3431112

[51] Int. Cl.$^4$ .............................................. B01F 15/02
[52] U.S. Cl. ..................................... 366/137; 222/135; 222/318
[58] Field of Search ................. 366/137, 136; 222/135, 222/1, 145, 129, 144.5, 318, 424; 137/625.4, 566, 624.18

[56] References Cited

U.S. PATENT DOCUMENTS

| 3,216,622 | 11/1965 | Drostholm | 222/135 |
| 3,386,623 | 6/1968 | Berrill et al. | 222/135 X |
| 3,773,300 | 11/1973 | Hauser | 222/135 X |
| 4,427,298 | 1/1984 | Fahy | 137/624.18 X |

FOREIGN PATENT DOCUMENTS 8203797 11/1982 World Int. Prop. O. .......... 366/136

Primary Examiner—Peter Nerbun

[57] ABSTRACT

In the case of a mixer head for reactive mixing of two or more plastics material components (A,B) in a mixing chamber (6), the mixture components are fed under the pressure simultaneously and conjointly into the mixing chamber (6) of the mixer head via a dosing valve (12, 14) in each case during a delivery stage. During a recirculation stage, the plastics material components are pumped around in a circulatory flow flowing through the dosing valve and through a recirculating valve (13, 15). To assure that even small delivery volumes per unit of time may be discharged evenly, the dosing valve (12, 14) and the recirculation valve (13, 15) are constructed as pressure valves and connected in series one behind the other, in such a manner that only the dosing valve or the recirculation valve is switched to the through-flow condition.

12 Claims, 9 Drawing Figures

MIXER HEAD FOR PLASTICS MATERIAL COMPONENTS

BACKGROUND OF THE INVENTION

The invention relates to a mixer head for reactive mixing of two or more plastics material components in a mixing chamber, which are ducted simultaneously and conjointly into the mixing chamber during the infeed stage, under pressure and via a dosing valve in each case, and pumped back in a circulatory flow which flows through the dosing valve during the recirculation stage.

A mixer head of this nature serves the purpose of processing reactive plastics material components, one plastics material component often being a polyol for example, and the other plastics material component an isocyanate (as in accelerator). An essential field of application of a mixer head of this kind is the production of seals or joints closed upon themsleves, for example such as utilised in the area of bulbs connecting the bulb cap and the bulb glass. Another purpose of application is the production of encircling door joints in the case of instrument cabinets and the like.

Small quantities only of the plastics material are utilised for the production of peripheral joints of this nature. In a typical case of application, the mixing ratio between the one component and the other amounts to 5:1 and an expulsion speed of 1 gramme per second is utilised. It is known however that the processing of the plastics materials in such small volume encounters great difficulties in the production of a peripheral joint by means of a mixer head as described above, the mixer head is displaced along processing track, so that during the infeed stage, a plastics material extrusion of a diameter of 5 mms for example is deposited in the groove of a bulb cap at a speed of 20 cms per second, for example. The mixer head travels along the groove and deposits its extrusion in the groove. Since the groove is encirclingly closed upon itself, the mixer head returns to its starting point and has to establish a seamless connection between the two extremities of the plastics material extrusion. The connection is established by the fact that the plastics material strings flow together before being foamed reactively, so that an expanded joint having a smooth outer skin and an uniform height is the result after a completed manufacturing operation.

This aim was secured but inadequately until now, because the mixer heads known until now deposited a greater quantity of the plastics material extrusion per unit of time at the beginning of the delivery stage than at the end. This was because a pressure peak occured upon passing from the recirculatory operation to the delivery stage, which had the result that a greater quantity of plastics material was deposited per unit of time at the beginning of the delivery stage than upon termination of the delivery stage. The pressure peak was caused primarily because the pressure of the flow of fluid was not controlled and the supply and return lines acted as pressure accumulators in view of their flexibility, which were charged at the time of recirculation and which discharged at the start of the delivery stage, so that a greater quantity of plastics material was ejected at the beginning of the delivery stage.

Because of the air charge in the fluid, the latter itself is also compressible, which equally contributed to the problem that a greater quantity of plastics material was deposited at the beginning of the delivery stage, than later.

The invention consequently has as its object to develop a mixer head of the kind defined in the foregoing, in such manner that the fluid pressure is kept constant with precision during the delivery and recirculation stages, so that the generation of the pressure peaks referred to in the foregoing no longer occurs.

To resolve the problem posed, the invention is characterised in that the dosing valve is constructed as a pressure control valve which has post-connected to it in series in each case a recirculation valve equally constructed as a pressure regulator valve, in such manner that either the dosing valve or the recirculation valve is switched to the throughflow setting.

It is thus a feature of the invention that the dosing valve and the recirculation valve are in each case constructed as pressure control valves and that both valves are connected one behind the other in series. It is accomplished thanks to the construction of the dosing valve as a pressure control valve, that the pressure within the fluid is kept constant rigorously, irrespective of whether the delivery stage or the recirculation stage is in progress.

By connecting a dosing valve in series with a recirculation valve in such a manner that only the dosing valve or the recirculation valve is switched to the throughflow state, it is accomplished that a pressure peak does not occur upon passing from the recirculation stage to the delivery stage.

In this connection, it is preferable that the control pressure of the dosing valve should be equal to the control pressure of the recirculation valve, so that no pressure peak is engendered upon switching from the recirculation valve to the dosing valve, because the conveying system is not alerted.

Thanks to the series connection of two analogous valves having identical control pressures, the conveyor system is consequently always preset so that only the correct valve traversed by flow during the recirculation stage, the dosing valve allocated to the mixing chamber is traversed by flow only such manner that the fluid is ducted past the nozzle bore closed off by a needle, to prevent settling of the fluid. During the delivery stage, a balance prevails between the hydrostatic force of the flow of fluid and the adjustable force of a spring. The spring is adjusted however that the needle clears the nozzle bore. If the fluid pressure acting at the one side of the needle increases, the increased return force of the spring then acts at the other side of the needle, so that the needle always remains balanced and opens the nozzle bore in the form of an annular gap of ever constant cross-section.

During the delivery stage, the recirculation valve is closed and the fluid flow impelled by the pump is led into the mixing chamber of the mixer head via the specified pressure controlled dosing valve.

The fluid flow of a single plastics material component only is described in the following. The fluid flow of the other component is wholly identical, so that the description of the one fluid flow is sufficient.

The pressure control of the dosing valve and of the recirculation valve is performed according to the restrictor principle. What is described is a constantly acting throttle valve of adjustable restrictor cross-section, because the tip of the needle clears an annular gap in the open state of the dosing valve whose size depends on the pressure within the system and on the preloading force of the spring.

All pressure control valves (flow valves) are thus covered by the principle of the present invention, irrespective of which throttling principle they utilise.

To secure reliable closing and opening of the throttle and recirculation valves, it is preferred that the valves should be preset by means of air control. The control air is applied in such manner that the dosing valve is kept closed securely by means of the control air during the recirculating operation, and that the recirculation valve is not acted upon by air and perform its regulatory function.

Conversely, the dosing valve is not acted upon by air during the delivery operation and performs its regulatory function, whereas the recirculation valve is reliably closed by means of the control air.

Extremely small quantities of plastics material can be processed successfully and uniformly per unit of time with the pressure control system described. In the case of one component, a discharge of no more than 0.2 grams per second is specified, in which connection this discharge quantity is kept precisely constant over a protracted period with success, using the mixer head of the present invention.

The invention is described in particular in the following with reference to drawings illustrating one mode of embodiment only. In this connection, other features and advantages of the invention emerge from the drawings and their description.

DETAILED DESCRIPTION

Figure 1:
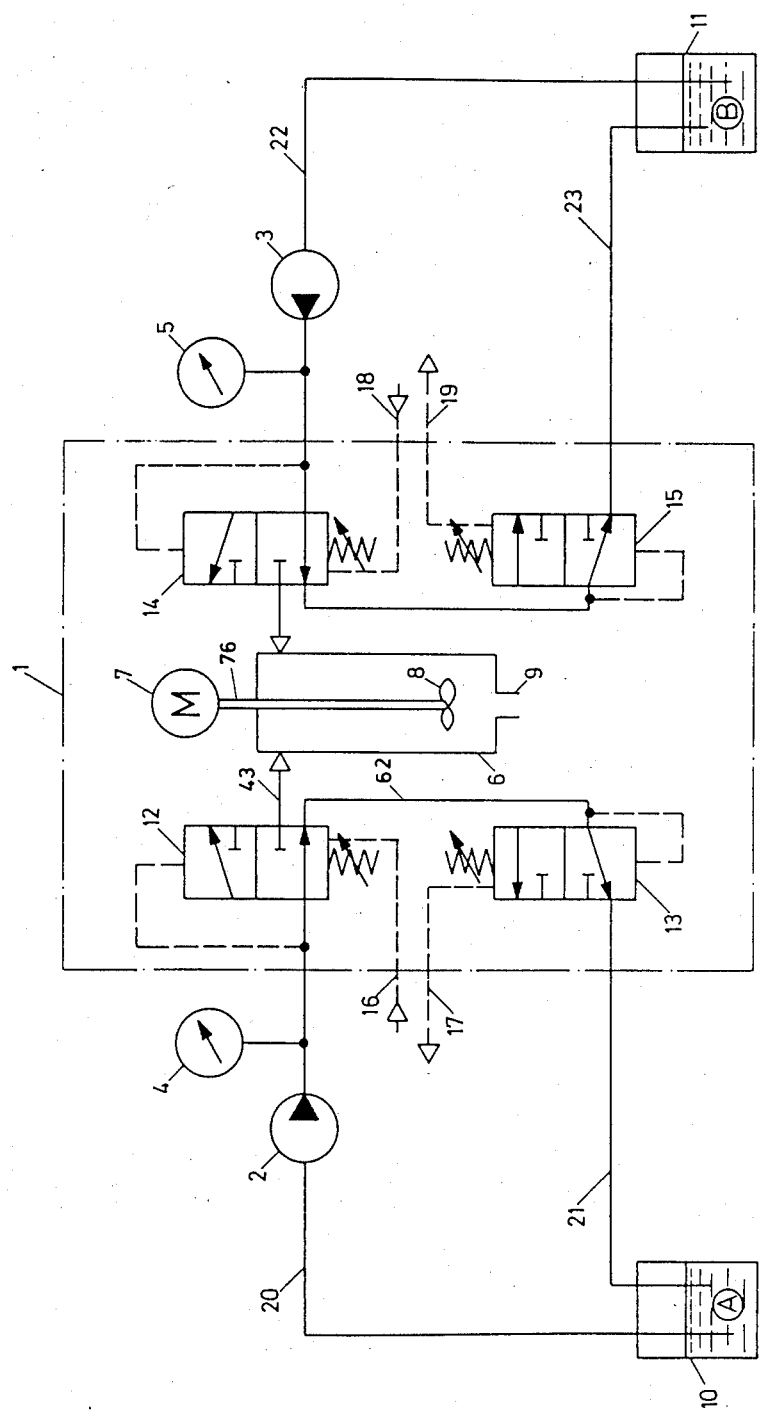
FIG. 1 shows diagrammatically a mixer circuit with two plastics material components.
Figure 2:
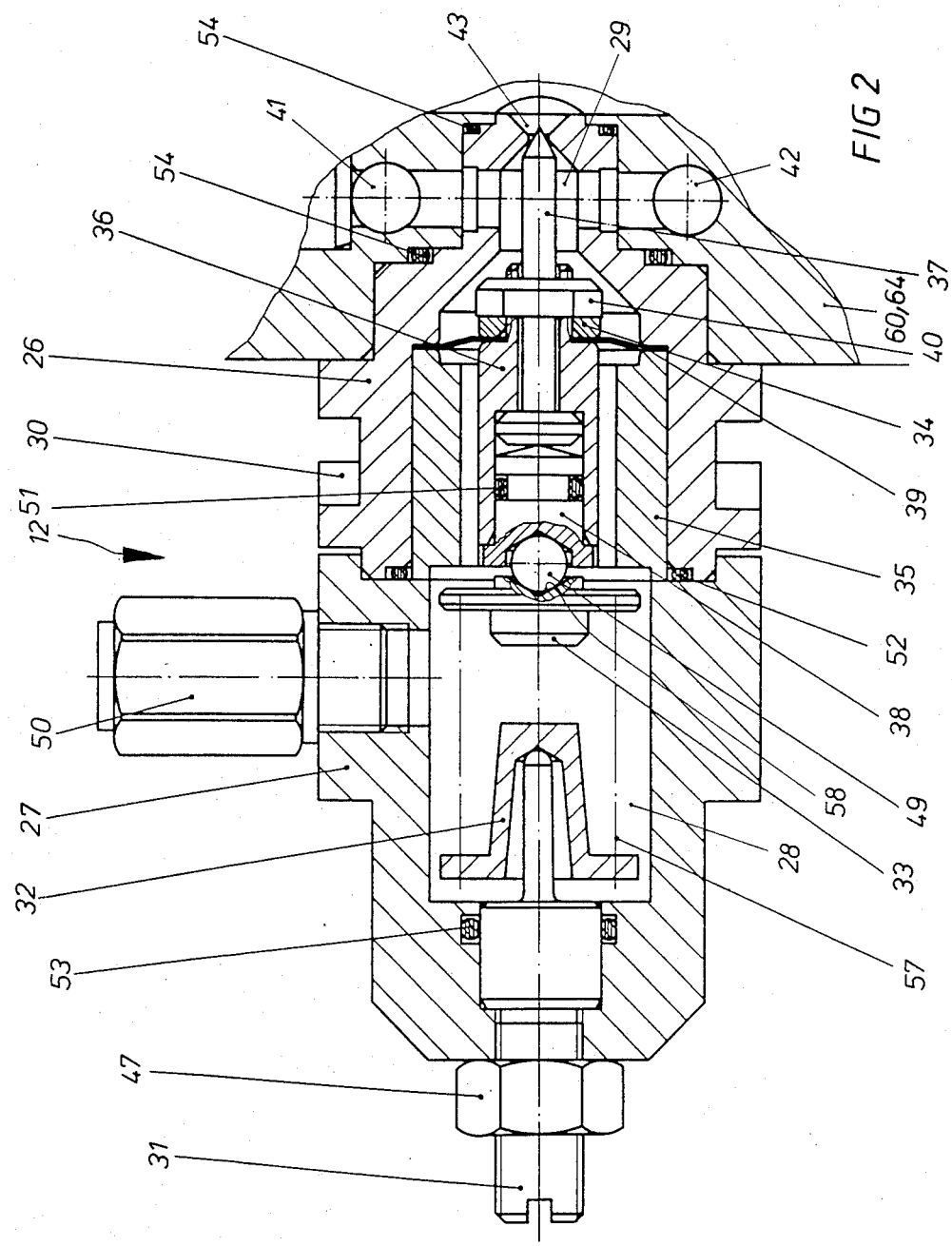
FIG. 2 shows a longitudinal cross-section through a dosing or recirculation valve according to the invention.
Figure 3:
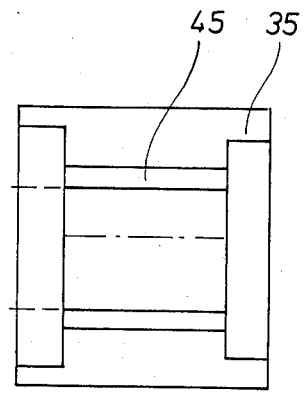
FIG. 3 shows a sideview of a bushing in FIG. 2.
Figure 4:
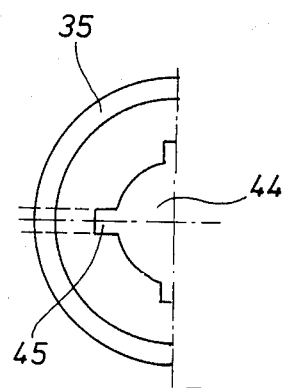
FIG. 4 shows an end view of the bushing according to FIG. 3.

The recirculation stage is illustrated diagrammatically in FIG. 1. One plastics material component A is impelled into the dosing valve 12 by a pump 2 via the intake pipe 20, from the tank 10. Meanwhile the pressure of the pump 2 is monitored by means of a pressure gauge 4. The dosing valve 12 is constructed as a pressure control valve and is switched to the by-pass state, so that the fluid is fed through the passage 62 to the connector of a recirculation valve 13 at which it flows into the recirculation pipe 21 under pressure control and return to the tank 10.

In an identical manner, the plastics material component B is impelled into the dosing valve 14 by the pump 3, via the intake pipe 22, from the tank 11 under monitoring by means of the pressure gauge 5, which valve is merely traversed in uncontrolled manner by this flow of fluid, whereupon the fluid enters the recirculation valve 15, at which it reaches the recirculation pipe 23 under pressure control and returns from the latter to the tank.

In the delivery stage, the dosing valves 12, 14 and the recirculation valves 13, 15 are switched by means of the air control 16, 17. To this end, the control air 16 is cut off from the dosing valves 12, 14 so that these assume the control state and that the plastics material component under pressure control penetrates into the mixing chamber 6 via the nozzle bore 43.

An agitator 8 is present in the mixing chamber 6 and is driven via a mixing motor 7, which mixes the two plastics material components A and B fed into it and feeds them to the processing station via the outflow nozzle 9.

It should also be noted that, during the delivery stage, when the control air 16, 18 is cut off from the dosing valves 12, 14, the recirculation valves 13, 15 are acted upon at the same time by control air 17, 19, so that these are blocked reliably.

Because the control pressure of the dosing valves 12, 14 corresponds to that of the recirculation valves 13, 15, the pumps 2, 3 do not detect any shift from the recirculation stage to the delivery stage, which assures that pressure peaks do not occur at the start of the delivery stage. Even if the fluid is compressible because of inclusion of air bubbles, and is conveyed in compressible ducts, no discharge phenomena occur from charged accumulators, because the pressure in the recirculation stage and in the pressure stage, is kept identical.

A particularly uncomplicated structural design derives from the fact that four identical valves 12–15 are utilized.

In the same way, it is possible to combine the control functions of the dosing valve 12, 14 and recirculating valve 13, 15 in a single valve, because it is always one valve only (either the dosing valve or the recirculation valve) which is operative under pressure control whereas the other valve should be closed reliably.

The problem posed in the foregoing may consequently also be resolved by the series connection of a pressure control valve with a 3/2 way valve. The 3/2 way valve performs the switching operation between the recirculating and delivery operations, whereas the fore-connected pressure control valve always assures a constant pressure in the system.

Because of the identical nature of the four valves 12, 15, it is sufficient according to FIGS. 2 to 7, to describe one valve only. The dosing valve 12 shown in FIG. 2 comprises a nozzle unit 26 which is connected in sealed manner to a back cover 27 and interposed O-rings 52 via screws not shown in particular. This delimits a central recess which is described as an air chamber 28. In the direction towards the nozzle bore 43, the air chamber 28 is delimited by a flexible diaphragm 39 which separates the air chamber 28 from the fluid chamber 29. The plastics material component A or B is introduced into the fluid chamber 29 via the connecting bores 41, flows around the needle 37 during the recirculation stage, which during this stage is seated in sealing manner in the nozzle bore 43, and flows out of the dosing valve 12 again via the connecting bore 42.

The pressure control action is obtained by the fact that the fluid pressure acts on the diaphragm 39 from the side of the fluid chamber 29, whereas the needle 37 is biased at the other side by the return force of a spring 57.

It is of importance in this connection that the needle 37 should be adjusted to have its tip fitting in precise sealing manner in the nozzle bore 43, because the same is mounted in an articulated manner with respect to the spring 57. Skewing movements of the spring 57 are taken up by the articulated mounting of the needle 37 in the area of a cylinder 36, so that this assures that the needle tip is always set centrally and sealingly in the nozzle bore 43.

Figures 5, 6:
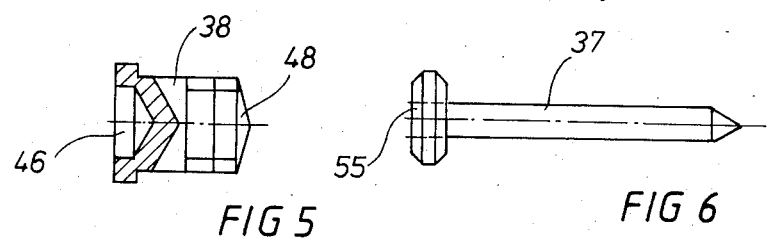
FIG. 5 shows a sideview with partial cross-sectioning through a bolt shown in FIG. 2.
FIG. 6 shows a sideview of a needle shown in FIG. 2.
Figure 7:
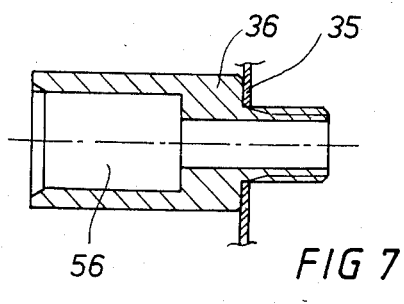
FIG. 7 shows a cross-section through a cylinder shown in FIG. 2.

According to FIG. 6, the needle 37 is provided at its extremity close to the spring with a disc 55 acted upon according to FIG. 5 by the tip 48 of a bolt or plunger 38, which at its back extremity close to the spring has a central recess 46. The plunger is fitted in sealing manner in the recess 56 of a cylinder 36 (FIG. 7) by means of an O-ring 51, a ball 49 engaging in the recess 46 of the plunger 38, whereof the other extremity engages in a corresponding central recess 58 in the area of a bearing sleeve 33. The bearing sleeve has a central disc or plate whereon is seated the one extremity of the spring 57 formed as a coil spring, whereof the other extremity bears on a bearing sleeve 32. A pin of an axially displaceable spindle 31 engages in the central bore of the bearing sleeve 32, which is screwed into the cover 27 of the valve unit by means of a corresponding screw-thread. The twisting displacement of the spindle 31 is stopped by means of the nut 47. The spindle 31 is sealed in the cover 27 by means of the O-ring 53.

The diaphragm 39 is thrust in sealing manner against an end-side stop of the cylinder 36 by means of a pressure balancing plate 34 and of a nut 40. The nut 40 has its inner screw-thread engaged on a corresponding external screw-thread on the extension of the cylinder 36.

The outer periphery of the diaphragm 39 is held fixedly between the end side of a bushing 35 and the corresponding inner surface of the nozzle unit 26.

To this end, the nozzle unit 26 is connected to the cover 27 via securing plates 30.

The case member 64 of the mixer head 60 bears sealingly on the front side of the nozzle unit 26 via O-rings 54.

To this end, the nozzle unit 26 forms a tapered nozzle opening 43, wherein the corresponding tapered tip of the needle 37 engages sealingly. If the dosing valve 12 is operating in the recirculating condition, control air 16 is fed in via the screw connector means 50, so that the diaphragm 39 is displaced towards the right and the needle 37 is held fast in the nozzle bore 43 in sealing manner. It is essential in this connection that the cylinder 36 is mounted in axially displaceable manner in the area of a central recess 44 of the bushing 35 and that the controlling air may reach the diaphragm 39 via grooves 45 radially arranged on the outer periphery of the recess 44.

Upon passing to operation of the delivery state, the controlling air 16 is cut off from the screw connection means 50 so that the dosing valve 12 shifts to the pressure control operation. The return force of the spring 57 is so adjusted that the tip of the needle 37 clears an annular cross-section in the area of the nozzle bore 43, so that the fluid flows out of the nozzle bore 43 from the fluid chamber 29 and penetrates into the mixing chamber 6 of the mixer head 1.

A pressure rise in the fluid chamber 29 acts via diaphragm 39 on the spring 57 thereby increasing its return force, so that the same pressure is always present in the fluid chamber 29. A complete mixer head comprising four valves 12–15 is illustrated in particular at this juncture in FIGS. 8 and 9. It should also be noted that the recirculating operation may be omitted in the case of plastics material components which are easy to process, so that the recirculation valves 13, 15 may also be omitted, and only the dosing valves 12, 14 are present instead. This embodiment (without recirculation valves) should also be encompassed by the protection of the present invention.

Figure 8:
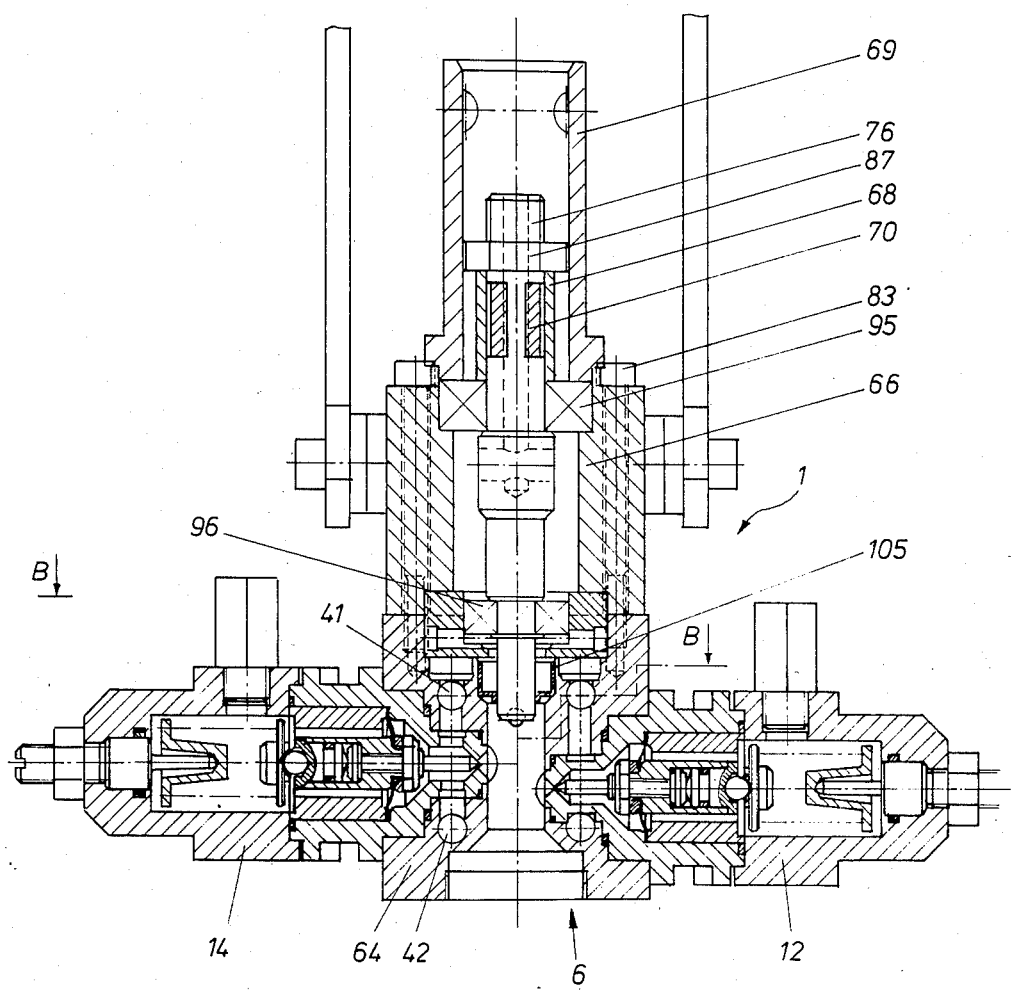
FIG. 8 shows a cross-section along the line A—A in FIG. 9 through a mixer head according to the invention.
Figure 9:
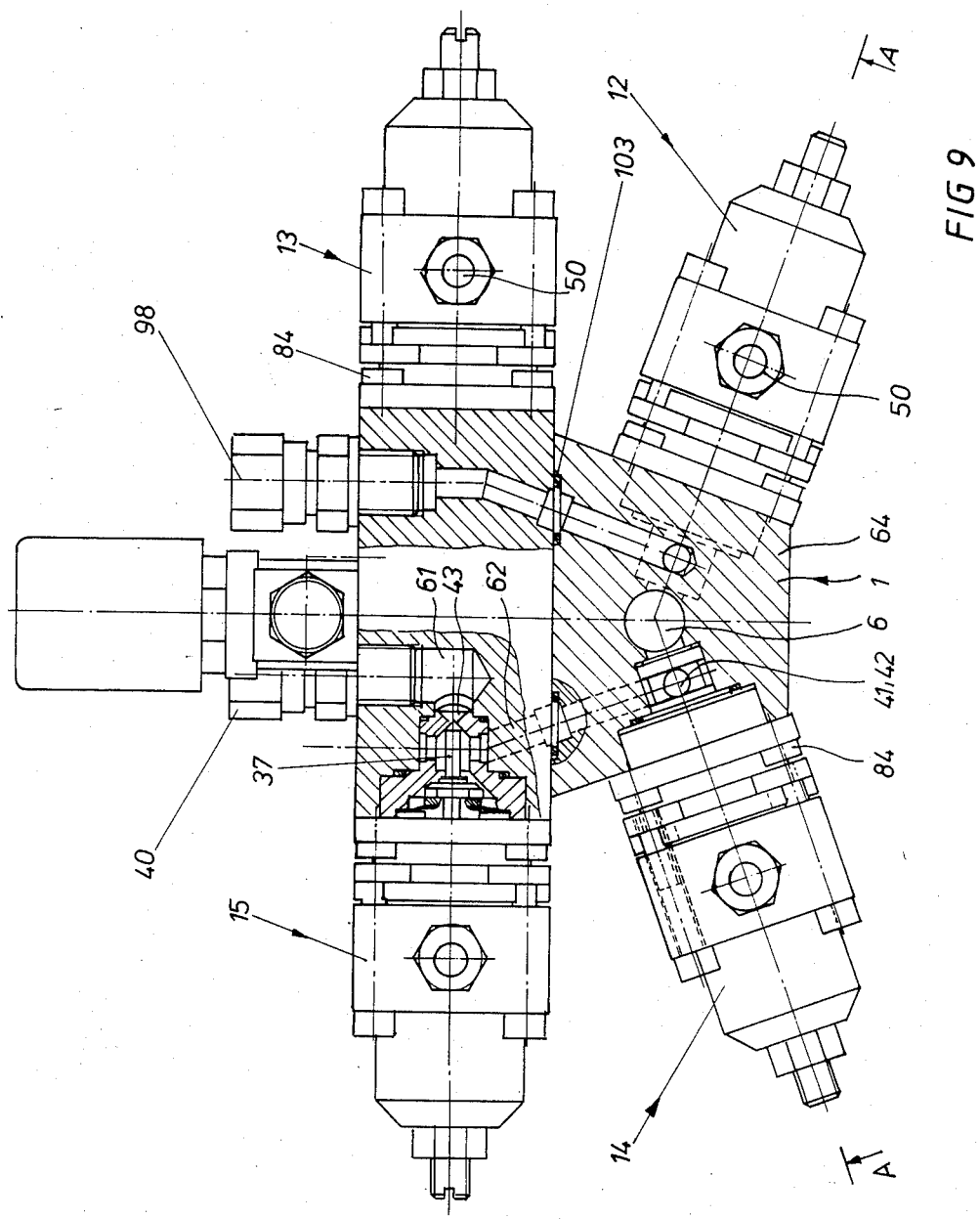
FIG. 9 shows a cross-section along the line B—B through the mixer head in FIG. 8.

The mixer head 1 shown in FIGS. 8 and 9 comprises an upper case member 66 and a lower case member 64 which are held together by appropriate screws 83.

The upper case section 66 has present on it a central flange 69 wherein a driving spindle 76 is installed in a rotationally drivable manner for an agitator which is illustrated diagrammatically in FIG. 1.

The driving spindle 76 comprises a top nut 87 which bears at the end side on a sleeve 68 immediately below it. Within the sleeve 68, the driving spindle 76 is provided with small radial plates 70.

The driving spindle 76 is rotatably journalled in upper and lower ball-bearings 95, 96 and passes via a spindle seal 105 into the mixing chamber 6 of the mixer head 1 in sealed manner wherein is situated an agitator not illustrated in particular.

The plastics material components which are to be processed are fed via an upper dosing unit (not illustrated) into the fluid connectors 98, 99 (FIG. 9) in a manner not illustrated in particular. The fluid then penetrates in each case into a passage 61 in which it reaches the connector 41 (see FIGS. 2 and 8) of the fluid passage 29 of the dosing valve 12, 14. The fluid is positioned therein behind the nozzle bore 43 and is fed into the mixing chamber 6 only when the controlling air has been cut off from the connector 50 during operation in the delivery mode and the needle is shifted into operation in the pressure control mode, so that the plastics material component enters the mixing chamber 6 under controlled pressure via the dosing valve 12, 14 (delivery operation).

The recirculation occurs as follows: The needle 37 closes the nozzle bore 43 of the dosing valve 12, 14 in such manner that the fluid coming from the bore 41 flows around the needle 37 and passes into the connecting passage 62 via the bore 42. The fluid coming from the passage 62 then enters the fluid chamber 29 of the recirculation valve 13, 15. The diaphragm 39 is loaded by the fluid pressure, in such manner that a balanced state is established with the preloaded spring 57 and that the needle 37 clears the nozzle bore 43. The fluid then flows via the nozzle bore 43 into the recirculation pipe (see corrected FIG. 9).

The construction-kit-like structure of the mixer head 1 is also apparent from FIGS. 8 and 9, disclosing as a matter of fact that the lower case section 64 comprising its passage 62 is attached to the side of the mixer head 1 via corresponding O-rings 103. The dosing valves 12, 14, together with the case section 64, may thus be replaced by dosing valves of a different kind. The valves 12–15 as such are joined to the case 64, 66 of the mixer head 1 via appropriate screws. 84.

What I claim is:

1. Mixer head for reactive mixing of two or more plastics material components in a mixing chamber, which are ducted simultaneously and conjointly into the mixing chamber during an infeed stage, under pressure and via a dosing valve in each case, and pumped back in a circulatory flow through the dosing valve during a recirculation stage, characterized in that the dosing valve is constructed as a pressure regulator valve, which has in each case connected to it downstream in series a recirculation valve also constructed as a presssure regulator valve in such manner that either the dosing valve or the recirculation valve is switched to the throughflow setting, with the governed pressure of the dosing valve corresponding to that of the recirculation valve to prevent pressure peaks during the transition from the recirculation stage to the infeed stage, with the dosing valve and the recirculation valve preset by means of air control, with the dosing valve and the recirculation valve in each case comprising a needle which has its point seated displaceably and sealingly in a nozzle bore which forms the outlet aperture for the fluid chamber, and that the needle is held in an axially displaceable manner in the nozzle bore under the adjustable returning force of a spring, with articulated mounting means of the needle with respect to the spring available to secure a sealing seat of the needle in the nozzle bore, with the spring loaded extremity of the needle constructed as a disc which has a thrust exerted on it at right angles by the apex of a bolt arranged in an axially displaceable manner in the area of the bore of a cylinder whereof the extremity close to the spring has a bearing sleeve mounted on it in an articulated manner, against which the one side of the spring is in contact.

2. Mixer head according to claim 1, characterised in that the articulated mounting of the bearing sleeve on the extremity of the bolt close to the spring is formed by a ball which engages on the one hand in an end-side recess of the bolt and on the other hand in a mating end recess of the bearing sleeve.

3. Mixer head according to claim 1, characterised in that to preset the dosing valve and the recirculation valve by means of air control, the fluid chamber is separated from the air chamber by a flexible diaphragm which is sealingly connected on the one hand to the cylinder displaceably receiving the needle on the one hand, and on the other hand fixedly to a bushing.

4. Mixer head according to claim 3, characterised in that the cylinder is displaceably located in an axial recess of the bushing and that several axially directed grooves are distributed outwards radially on the periphery of the recess.

5. Mixer head having a mixing chamber for reactive mixing of two or more plastics material components, which each are being ducted via a suction line from a reservoir to a dosing valve, and there being attached to each circulating line a recirculation valve, which at the occurence of a pressure increase returns part of the material to the reservoir, characterized in that the dosing valve (12,14) at its outlet in the region of its fluid chamber (29) is provided with a bore (42) to which, via a passage (62) there is connected the fluid chamber of the recirculation valve (13,15), having recirculation lines (21,23) leading to the reservoir.

6. Mixer head according to claim 5 characterized in that both the dosing valve (12,14) and the recirculation valve (13,15) are pilot controlled by control air.

7. Mixer head according to claim 5, characterized in that both the dosing valve (12,14) and the recirculation valve (13,15) are having the same pressure regulating characteristic.

8. Mixer head according to claim 5, characterized in that the recirculation valve (13,15) in each case comprise a needle (37), the end of which being formed as a disc (55) against which the seat of a plunger or bolt (38), in engagement with a spring (57), via a bearing sleeve (33) is pressing.

9. Mixer head according to claim 8, characterized in that the bearing of the needle (37) in respect to said spring (57) is provided in an articulated manner.

10. Mixer head according to claim 9, characterized in that the articulated bearing is formed by a ball (49) being arranged between said plunger or bolt (38) and said bearing sleeve (33).

11. Mixer head according to claim 5 characterized in that for the pilot control of both the dosing valve (12,14) and the recirculation valve (13,15) by means of control air, the dosing valve's fluid chamber (29) is separated from its air chamber (28) by a flexible diaphragm (39) which on the one hand is sealingly connected to a cylinder (36) displaceably receiving a needle (37) and on the other hand is connected to a bushing (35).

12. Mixer head according to claim 11, characterized in that the cylinder (36) is displaceably guided in an axial recess (44) of said bushing (35) and that radial outwardly distributed on the periphery of the recess (44) a plurality of axially directed grooves (45) are arranged.

* * * * *